Patented Aug. 5, 1941

2,251,288

UNITED STATES PATENT OFFICE 2,251,288

MANUFACTURE OF RESISTANT MATERIALS

Robert Wighton Moncrieff and Alfred Richmond, Spondon, near Derby, England, assignors to Celanese Corporation of America, a corporation of Delaware No Drawing. Application December 7, 1938, Serial No. 244,386. In Great Britain December 14, 1937

1 Claim. (Cl. 23—240)

This invention relates to articles, especially pipes, containers and agitating apparatus therefor, which are resistant to the action of aqueous fatty acids, and to the production and use of such acid resistant articles.

In the manufacture of cellulose esters, for instance cellulose acetate, considerable quantities of aqueous fatty acids, e. g. aqueous acetic acid of between 40 or 50 and 60 or 70% concentration, are handled, and difficulty is experienced in providing containers which are capable of resisting the action of such acids.

We have found that articles and especially articles of wood can be rendered resistant to the action of an aqueous fatty acid by coating or impregnating the materials with a cellulose ester containing a high proportion of the acid radicle of said acid especially a fully esterified cellulose ester of the acid in question and that containers, vessels, vats, tanks, pipes, paddles and other components of agitating apparatus, and other articles constructed of materials so treated are particularly suitable for use with such acids. Thus the containers and other articles may be constructed of wood or other fibrous material and coated or impregnated with the cellulose ester. The most important application of the invention is in providing the articles, especially wooden vats, with a coating of cellulose triacetate or of a cellulose acetate approximating in composition to the triacetate which is resistant to aqueous acetic acid.

The wood or other material may be coated or impregnated with the cellulose ester in any suitable manner. Thus the material may be painted or sprayed with a solution of the cellulose ester in a volatile solvent, for instance a solution of cellulose triacetate in chloroform, or may be dipped into such a solution. An emulsion or paste of the cellulose ester in a non-solvent liquid such as water may if desired be employed. The solution, emulsion or paste may contain in solution or suspension other substances, for instance pigments, fillers, plasticisers, gums or synthetic resins. The wood or other material may be treated before being made into the containers or other articles, but in general it is preferable to construct the articles of the untreated material and then coat or impregnate them with the cellulose derivative. If desired, the material may be given more than one coating of the cellulose derivative composition.

Where the protective cellulose derivative composition to be applied is one that will not readily adhere to the surface to be coated, for instance where a surface of iron or other metal is to be coated with cellulose acetate or other fatty acid ester of cellulose, it is of advantage to apply one or more coatings of priming composition to the surface before applying the final coating or coatings of the protective cellulose ester composition. As priming composition there may be employed a coating composition containing nitrocellulose or containing a synthetic resin, especially a synthetic resin compatible with the cellulose ester in the protective composition to be applied to the priming composition. Thus in the case of cellulose acetate synthetic resins of the sulphonamide-aldehyde and phenol-aldehyde (especially dinuclear phenol-formaldehyde) types are very suitable. If more than one priming coating is applied, some or all of these coatings may be different. Thus the first coating may be of a varnish containing, for instance, linseed oil and a resin, and the second a nitrocellulose coating. Alternatively, all the priming coatings may contain the same film-forming material, e. g. nitrocellulose, but otherwise be of different constitution. The priming coatings may contain pigments, fillers, gums or plasticisers.

The invention includes the use of acid resistant containers, pipes and other articles produced as described above in the storage, transport and treatment of aqueous fatty acids, particularly aqueous acetic acid.

The following example illustrates the invention:

Example

A wooden vat which is intended to hold 50–60% aqueous solutions of acetic acid is treated as follows:

The inside of the vat is well dried by allowing it to remain in a dry atmosphere for several days. A solution made by dissolving 6 parts by weight of cellulose triacetate in 70 parts by weight of chloroform is then applied to the inside of the vat by brushing. The coat is allowed to sink well into the wood and to dry and a further coat is then applied in the same way. This is then allowed to dry and the vat is ready for use.

During the application of the paint suitable precautions must be taken to protect the operatives against the toxic effects of chloroform vapour.

The invention has been described with particular reference to cellulose acetate, but other organic esters of cellulose containing a high proportion of acid radicle may be employed in connection with the corresponding fatty acid, for instance, cellulose propionates and cellulose butyrates containing a high proportion of propionyl or butyryl groups, e. g. 2½–2¾ or 3 of such groups per $C_6H_{10}O_5$ unit.

Cellulose acetates with an acetyl content of about 58% or more, calculated as acetic acid, are especially suitable for use according to the invention. In general, the higher the molecular weight of the acid radicle in the ester and/or the milder the conditions of esterification the lower the proportion of acid radicle necessary. Cellulose esters produced with the aid of chloride catalysts such as ferric chloride, zinc chloride and stannic chloride as described for instance in U. S. Patents Nos. 1,936,585, 1,936,586 and 1,950,663 or produced in the presence of large quantities of acetic acid or other suitable diluent as described for instance in U. S. Patent No. 1,708,787 are particularly suitable.

Cellulose acetates of high acetyl content produced by acetylating ordinary acetone-soluble cellulose acetate in the presence of the ferric chloride and other chloride catalysts referred to above are of especial value.

Having described our invention, what we desire to secure by Letters Patent is:

A container suitable for the bulk storage of aqueous acetic acid, said container having an inner surface of wood coated with an acetate of cellulose of acetyl value not less than about 58% calculated as acetic acid.

ROBERT WIGHTON MONCRIEFF.
ALFRED RICHMOND.